(12) United States Patent
Kuntimaddi et al.

(10) Patent No.: US 7,517,943 B2
(45) Date of Patent: Apr. 14, 2009

(54) GOLF BALL LAYER COMPOSITIONS FORMED FROM OXIRANE FUNCTIONAL ENDCAPPED POLYMERS

(75) Inventors: Manjari Kuntimaddi, Plymouth, MA (US); Shenshen Wu, Shrewsbury, MA (US); Murali Rajagopalan, South Dartmouth, MA (US); Matthew F. Hogge, Plymouth, MA (US); Steven R. Zawacky, Pittsburgh, PA (US); Michael A. Mayo, Pittsburgh, PA (US)

(73) Assignee: Acushnet Company, Fairhaven, MA (US)

( * ) Notice: Subject to any disclaimer, the term of this patent is extended or adjusted under 35 U.S.C. 154(b) by 326 days.

(21) Appl. No.: 11/294,616

(22) Filed: Dec. 6, 2005

(65) Prior Publication Data

US 2007/0129510 A1    Jun. 7, 2007

(51) Int. Cl.
  *A63B 37/00* (2006.01)
  *A63B 37/12* (2006.01)
  *C08G 18/10* (2006.01)
  *C08G 18/58* (2006.01)

(52) U.S. Cl. .............. 528/73; 528/59; 528/60; 528/61; 528/63; 528/64; 528/65; 525/454; 473/372; 473/373; 473/374; 473/378

(58) Field of Classification Search .............. None
  See application file for complete search history.

(56) References Cited

U.S. PATENT DOCUMENTS

| | | | |
|---|---|---|---|
| 3,445,436 A * | 5/1969 | Lake et al. ................ 528/49 |
| 5,006,297 A | 4/1991 | Brown et al. ............. 264/234 |
| 5,334,673 A | 8/1994 | Wu ..................... 273/235 R |
| 5,484,870 A | 1/1996 | Wu ........................... 528/28 |
| 5,688,191 A | 11/1997 | Cavallaro et al. ........ 473/373 |
| 5,692,974 A | 12/1997 | Wu et al. ................. 473/377 |
| 5,713,801 A | 2/1998 | Aoyama ................. 473/354 |
| 5,733,428 A | 3/1998 | Calabria et al. ......... 264/134 |
| 5,803,831 A | 9/1998 | Sullivan et al. .......... 473/374 |
| 5,885,172 A | 3/1999 | Hebert et al. ............ 473/354 |
| 5,908,358 A | 6/1999 | Wu ........................ 473/378 |
| 5,919,100 A | 7/1999 | Boehm et al. ............ 473/354 |
| 5,965,669 A | 10/1999 | Cavallaro et al. ........ 525/221 |
| 5,981,654 A | 11/1999 | Rajagopalan ............ 525/66 |
| 5,981,658 A | 11/1999 | Rajagopalan et al. .... 525/72 |
| 6,056,842 A | 5/2000 | Dalton et al. ............ 156/243 |
| 6,149,535 A | 11/2000 | Bissonnette et al. ..... 473/354 |
| 6,180,040 B1 | 1/2001 | Ladd et al. .............. 264/248 |
| 6,180,722 B1 | 1/2001 | Dalton et al. ............ 525/193 |
| 6,207,784 B1 | 3/2001 | Rajagopalan ............ 528/71 |
| 6,290,611 B1 | 9/2001 | Rajagopalan et al. .... 473/371 |
| 6,386,992 B1 | 5/2002 | Harris et al. ............. 473/371 |
| 6,476,130 B1 | 11/2002 | Rajagopalan et al. .... 525/74 |
| 6,503,156 B1 | 1/2003 | Sullivan ................... 473/374 |
| 6,506,130 B2 | 1/2003 | Sullivan ................... 473/374 |
| 6,593,401 B1 | 7/2003 | Park et al. ................ 523/458 |
| 2001/0009310 A1 | 7/2001 | Herbert et al. |
| 2001/0018375 A1 | 8/2001 | Hayashi et al. |
| 2001/0019971 A1 | 9/2001 | Hayashi et al. |
| 2001/0046906 A1 | 11/2001 | Rajagopalan et al. |
| 2002/0025862 A1 | 2/2002 | Sullivan et al. |
| 2002/0028885 A1 | 3/2002 | Sullivan et al. |
| 2002/0155906 A1 | 10/2002 | Sullivan et al. |
| 2002/0160860 A1 | 10/2002 | Rajagopalan et al. |
| 2003/0027667 A1 | 2/2003 | Sullivan |
| 2003/0027669 A1 | 2/2003 | Sullivan |
| 2003/0069085 A1 | 4/2003 | Hogge et al. |
| 2003/0078348 A1 | 4/2003 | Rajagopalan et al. |
| 2003/0106442 A1 | 6/2003 | Gosetti |
| 2003/0119989 A1 | 6/2003 | Ladd et al. |
| 2004/0132546 A1* | 7/2004 | Kuntimaddi et al. ..... 473/373 |
| 2005/0009637 A1 | 1/2005 | Wu et al. |

OTHER PUBLICATIONS

Blank, Werner J., Catalysis of the Epoxy-Carboxyl Reaction, King Industries Inc.

* cited by examiner

*Primary Examiner*—David Buttner
(74) *Attorney, Agent, or Firm*—Hanify & King, P.C.

(57) ABSTRACT

Compositions for golf balls including oxirane functional endcapped polymers and, in particular, compositions formed from polyurethane-based or polyurea-based prepolymers that are endcapped with an oxirane functional group. The oxirane functionality is opened with a suitable curing agent to provide a composition that has flexibility via the prepolymer backbone and stiffness via the oxirane functional endcaps.

22 Claims, No Drawings

GOLF BALL LAYER COMPOSITIONS FORMED FROM OXIRANE FUNCTIONAL ENDCAPPED POLYMERS

FIELD OF THE INVENTION

The invention relates to golf balls having at least one layer including oxirane functional endcapped polymers. In particular, the present invention is directed to a composition formed from a polyurethane-based or polyurea-based prepolymer that is endcapped with an oxirane functional group. The oxirane functionality is opened with a suitable curing agent to provide a composition that has flexibility via the prepolymer backbone and stiffness via the oxirane functional endcaps.

BACKGROUND OF THE INVENTION

Golf ball manufacturers are constantly trying to achieve the perfect balance between feel and performance. For example, golf ball covers formed from balata allow players to achieve spin rates sufficient to control ball direction and distance, particularly on shorter shots, but balata covers are easily damaged. In contrast, golf balls covers formed from ionomer resins provide higher durability and overall distance, but the spin and feel are inferior compared to balata covered balls. And, unlike ionomer-covered golf balls, polyurethane covered golf balls can be formulated to possess the soft "feel" of balata covered golf balls, however, golf ball covers made from polyurethane have not, to date, fully matched ionomer-covered golf balls with respect to resilience or the rebound of the golf ball cover. In addition, polyurethane-covered golf balls are generally susceptible to yellowing (due to the aromatic nature of the material) and moisture absorption. While paints and moisture barrier layers may be used to counteract against the yellowing and moisture absorption in polyurethane-covered balls, the resilience and rebound are more difficult to design around.

Polyurea materials have recently come onto the scene for golf ball layer materials due to the improved resilience and adherence to layers formed of different materials. In addition, because polyurea-based compositions may be formed from aliphatic materials, the yellowing of aromatic polyurethane-covered golf balls is typically not an issue for polyurea-covered golf balls. Similar to polyurethane, however, because a polyurea golf ball cover is generally softer than a thermoplastic ionomer golf ball cover, the shear (cut) resistance does not compare to an ionomer-covered golf ball.

Therefore, there remains a continuing need for golf equipment having components having a soft "feel" that provide improved resilience, increased shear (cut), scratch and abrasion resistance, moisture resistance, and enhanced adherence without adversely affecting overall performance characteristics of the golf balls. Thus, it would be advantageous to provide a composition that combines the shear and scratch resistance of ionomer resins with the soft "feel" of a polyurethane or polyurea that is suitable for forming golf ball components and other golf-related equipment.

SUMMARY OF THE INVENTION

The present invention is directed to a golf ball including a core and a cover, wherein at least a portion of the golf ball is formed from a composition including an intermediate formed from a polyurea prepolymer or a polyurethane prepolymer and an oxirane functional resin, wherein the intermediate comprises at least one terminal group including an oxirane functionality, and wherein the intermediate is crosslinked with a curing agent.

The oxirane functional resin includes a first functional group comprising an oxirane functionality and a second reactive functional group. In one embodiment, the oxirane functional resin includes reaction products of phenols or carboxylic acids and epichlorohydrin, reaction products of an aliphatic polyols and epichlorohydrin, oxidized polyolefins, and combinations thereof. In another embodiment, the oxirane functional resin comprises glycidol, a cycloaliphatic epoxy resin, or a mixture thereof. In yet another embodiment, the oxirane functional resin comprises glycidyl glycidate; 2,3-epoxybutyl-3,4-epoxypentanoate; 3,4-epoxy-3,4-epoxyhexyl; 3,4-epoxypentanoate; diglycidyl adipate; diglycidyl isophthalate; di(2,3-epoxybutyl)adipate; di(2,3-epoxybutyl) oxalate; di(2,3-epoxyhexyl)succinate; di(3,4-epoxybutyl) maleate; di(2,3-epoxyoctyl)pimelate; di(2,3-epoxybutyl)phthalate; di(2,3-epoxyoctyl)tetrahydrophthalate; di(4,5-epoxydodecyl)maleate; di(2,3-epoxybutyl)teraphthalate; di(2,3-epoxypentyl)thiodipropionate; di(5,6-epoxytetradecyl)diphenyldicarboxylate; di(3,4-epoxyheptyl)sulfonyldibutyrate; di(5,6-epoxypentadecyl)maleate; di(2,3-epoxybutyl)azelate; di(3,4-epoxybutyl)citrate; di(5,6-epoxyoctyl)cyclohexane-1,3-dicarboxylate; di(4,5-epoxyoctadecyl)malonate; tri(2,3-epoxybutyl)-1,2,4-butanetricarboxylate; or mixtures thereof.

The curing agent may include saturated or unsaturated primary, secondary, and tertiary amines and adducts thereof, polyamides, carbamates, phenols, thiols, anhydrides, low molecular weight acids, and mixtures thereof. In one embodiment, the curing agent is selected from the group consisting of ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; m-phenylene diamine; 4,4'-bis-(sec-butylamino)-diphenylmethane and derivatives thereof; diaminophenyl sulphone; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; piperidine; tertiary amines, such as triethylamine, benzyldimethylamine, dimethylaminomethyl phenol, tri(dimethylamino-methyl)phenol, and tri-2-ethylhexoate salt of tri(dimethylaminomethyl)phenol; and mixtures thereof.

In one embodiment, the intermediate has the following structure:

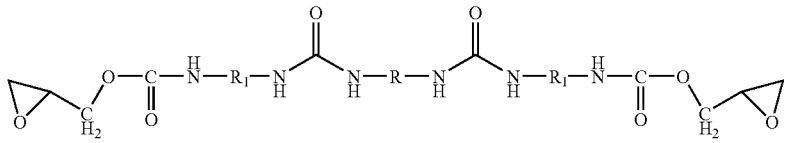

wherein R and $R_1$ independently comprise straight or branched hydrocarbon moieties, acyclic groups, cyclic groups, heterocyclic groups, aromatic groups, phenyl groups, hydrocarbylene group, or a mixture thereof.

The present invention is also directed to a golf ball including a core and a cover, wherein at least a portion of the cover is formed from a composition including an intermediate having at least one epoxy endcap, wherein the intermediate is the reaction product of a polyurethane prepolymer and an oxirane functional resin comprising a glycidol group; and a curing agent selected from the group consisting of saturated or unsaturated primary, secondary, and tertiary amines and adducts thereof; polyamides; carbamates; phenols; thiols; anhydrides; low molecular weight acids; and mixtures thereof.

In one embodiment, the polyurethane prepolymer includes an isocyanate and a polyol. In another embodiment, the intermediate has the following structure:

groups, heterocyclic groups, aromatic groups, phenyl groups, hydrocarbylene group, or a mixture thereof.

In one embodiment, the portion is the cover of the golf ball. For example, the cover of the golf ball may include an inner cover layer and an outer cover layer, and wherein the outer cover layer includes the composition. The material used to form the inner cover may be any suitable thermoplastic or thermoset material. For example, in one embodiment, the inner cover layer includes a highly neutralized polymer. The golf ball may also include an intermediate layer. The intermediate layer may be formed from any suitable thermoplastic or thermoset material.

The present invention also relates to golf balls including a core and cover, wherein the cover is formed from a composition including an intermediate having at least one of the following structures:

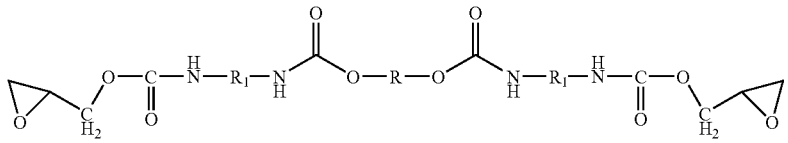

wherein R and $R_1$ independently comprise straight or branched hydrocarbon moieties, acyclic groups, cyclic

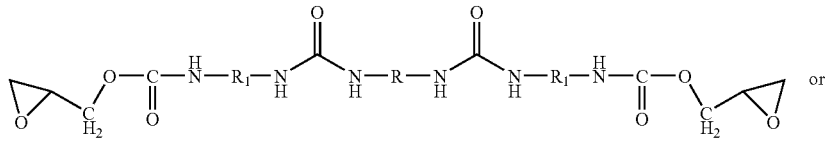

or

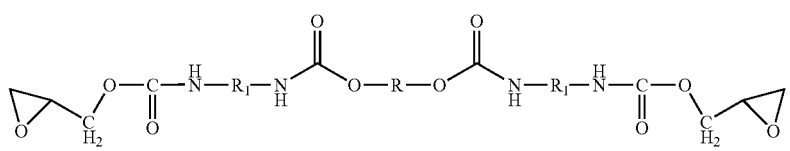

wherein R and $R_1$ independently comprise straight or branched hydrocarbon moieties, acyclic groups, cyclic groups, heterocyclic groups, aromatic groups, phenyl groups, hydrocarbylene group, or a mixture thereof; and wherein the intermediate is cured with a curing agent.

The curing agent may include reactive functional groups selected from the group consisting of hydroxy groups, amino groups, thiol groups, epoxy groups, anhydride groups, and combinations thereof. In one embodiment, the curing agent may include non-reactive functional groups selected from the group consisting of chlorine, bromine, and substituted sulfur moieties. In another embodiment, the curing agent includes a curative and a catalyst. The catalyst may include phosphine salt, phosphonium salt, or a mixture thereof.

DETAILED DESCRIPTION OF THE INVENTION

The present invention contemplates compositions formed with oxirane functional endcapped polymers that provide improved shear resistance and moisture resistance while maintaining the soft "feel" of polyurethane and polyurea compositions. In particular, the compositions of the invention preferably include polyurethane-based and polyurea-based endcapped with epoxy groups. The oxirane functional rings are opened and crosslinked with a suitable curing agent providing a composition that is flexible with good shear resistance. The compositions of the invention may be used in a variety of golf ball constructions, i.e., one-piece, two-piece, or multilayer balls, as well as other golf equipment components, such as club head and shoe inserts.

One of the major differences between the compositions of the invention and polyurethane or polyurea compositions is that the NCO groups on the polyurethane or polyurea prepolymer do not form urethane or urea linkages directly with the functional groups in the curing agent. Instead, the NCO groups of the isocyanate react with functional groups on the epoxy ring to form an oxirane functional endcapped intermediate. For example, as shown in the general mechanism below, a hydroxy group attached to the oxirane ring reacts with the NCO groups on the prepolymer to form an intermediate:

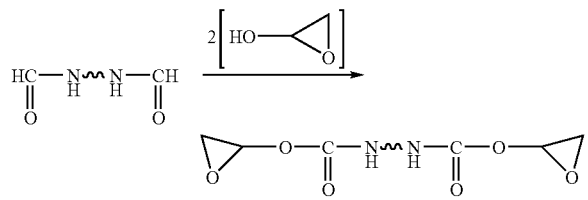

The epoxy ring is, therefore, left unaffected and available for crosslinking. The oxirane functional endcapped intermediate is then reacted with a curing agent capable of opening the oxirane ring thus providing a cured system.

As such, the compositions of the invention capitalize on the beneficial properties of the separate polymers, while compensating for, or completely overcoming, their deficiencies to arrive at a material that provides enhanced durability, i.e., improved shear resistance and moisture resistance, and a soft feel. For example, oxirane functional polymers, e.g., epoxy resins, provide excellent chemical resistance properties, excellent adhesion, and versatility in crosslinking, but, once cured, result in a material with a hard "feel" when struck with a club. On the other hand, polyurethanes and polyureas are generally soft and flexible, but have decreased durability. Thus, the compositions of the invention incorporate the flexibility of the polyurethane-based or polyurea-based backbone, yet are resilient with enhanced shear resistance due to the cured oxirane functional groups.

The Compositions of the Invention

As briefly discussed above, the compositions of the invention may be based on a backbone including a polyurethane-based prepolymer or a polyurea-based prepolymer. In the context of the present invention, the term "prepolymer" refers generally to a macromonomer or partially polymerized material formed by the reaction product of at least two components, each having a functionality that is reactive with at least one other component under the appropriate circumstances, which macromonomer or partially polymerized material can be subsequently reacted with at least one other component (which may be the same as one of the at least two components or different) to form a polymer. In particular, a "prepolymer" may refer to a material containing at least one isocyanate-containing component and at least one isocyanate-reactive component, for example, such as a polyol, a polyamine, or a mixture thereof.

The polyurea prepolymer is the reaction product of an amine-terminated component and an isocyanate, whereas the polyurethane prepolymer is the reaction product of a hydroxy-terminated component and an isocyanate. The particular components of the prepolymers will be discussed in greater detail below.

Because the main difference between the polyurea prepolymer and the polyurethane prepolymer is the amine-terminated component/polyol component, the isocyanates discussed are intended to be used in either type of prepolymer.

The Isocyanate Component

Any isocyanate having two or more isocyanates groups, e.g., two to four isocyanate groups, bonded to an organic radical, may be used to form the prepolymers of the present invention. The general formula of a suitable isocyanate for use with the present invention is as follows:

$$R—(NCO)_x$$

where R may be any organic radical having a valence x. In one embodiment, R is a straight or branched hydrocarbon moiety, acyclic group, cyclic group, heterocyclic group, aromatic group, phenyl group, hydrocarbylene group, or a mixture thereof. For example, R may be a hydrocarbylene group having about 6 to about 25 carbons, preferably about 6 to about 12 carbon atoms. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Because light stability of the compositions of the invention may be accomplished in a variety of ways for the purposes of this application, i.e., through the use of saturated components, light stabilizers, whitening agents, or a mixture thereof, the isocyanate used in the prepolymer may be saturated, semi-saturated, unsaturated, or a mixture thereof. For example, isocyanates for use with the present invention include aliphatic (saturated), cycloaliphatic, aromatic aliphatic (semi-saturated), aromatic (unsaturated), any derivatives thereof, and combinations of these compounds having two or more isocyanate (NCO) groups per molecule. The term "saturated," as used herein, refers to compositions having saturated aliphatic and alicyclic polymer backbones, i.e., with no carbon-carbon double bonds. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. In one embodiment, triisocyanates are used to form the prepolymer, which ultimately results in three-dimensional crosslinking with the curing agent.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'-and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4' dicyclohexylmethane diisocyanate (H12MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Of the list above, the following isocyanates are saturated: ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H12MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof.

The Polyol and Polyamine Components

A polyurethane prepolymer is the reaction product of an isocyanate and a polyol. Exemplary polyols include, but are not limited to, polyether polyols, polycaprolactone polyols, polyester polyols, polycarbonate polyols, hydrocarbon polyols, and mixtures thereof. Both saturated and unsaturated polyols are suitable for use with the present invention.

Suitable polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene) glycol; poly(oxypropylene) glycol; ethylene oxide capped (polyoxypropylene)glycol; poly (oxypropylene oxyethylene) glycol; and mixtures thereof.

Suitable polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; ortho-phthalate-1,6-hexanediol polyester polyol; polyethylene terephthalate polyester polyols; and mixtures thereof.

Examples of polycarbonate polyols that may be used with the present invention include, but is not limited to, poly(phthalate carbonate) glycol, poly(hexamethylene carbonate) glycol, polycarbonate polyols containing bisphenol A, and mixtures thereof. Hydrocarbon polyols include, but not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof. Other polyols that may be used to form the prepolymer of the invention include, but not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

By using polyols based on a hydrophobic backbone, the polyurethane prepolymers may be more water resistant than those prepolymers formed from a polyol without a hydrophobic backbone. Some non-limiting examples of polyols based on a hydrophobic backbone include hydrocarbon polyols, hydroxy-terminated polybutadiene polyols, polyethers, polycaprolactones, and polyesters.

In contrast to polyurethane prepolymers, polyurea prepolymers are the reaction product of an amine-terminated component and an isocyanate. Any amine-terminated compound available to one of ordinary skill in the art is suitable for use in the polyurea prepolymer. The amine-terminated compound may include amine-terminated hydrocarbons, amine-terminated polyethers, amine-terminated polyesters, amine-terminated polycarbonates, amine-terminated polycaprolactones, copolymers of polycaprolactone and polyamines, amine-terminated polyamides, and mixtures thereof. The amine-terminated segments may be in the form of a primary amine ($NH_2$) or a secondary amine (NHR). Nonlimiting examples of suitable amine-terminated compounds are disclosed in co-pending U.S. patent application Ser. No. 10/900,469, filed on Jul. 28, 2004, the entire disclosure of which is incorporated by reference herein.

The molecular weight of the amine-terminated compound for use in the invention may range from about 100 to about 10,000. As used herein, the term "about" is used in connection with one or more numbers or numerical ranges, should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines may be prone to forming solid polyureas, a higher molecular weight oligomer may be used to avoid solid formation.

The polyurea prepolymer may also be formed with at least one amine-terminated compound based on a hydrophobic backbone for increased water resistance. For example, the amine-terminated compound may be an unsaturated or saturated hydrocarbon-based amine-terminated compound, one example of which is an amine-terminated polybutadiene.

The Oxirane Functional Resin

The oxirane functional resin of the present invention includes a compound having at least two functional groups, i.e., a first functional group containing an oxirane functionality and a second functional group other than the oxirane. The oxirane functionality may be obtained from any suitable compound containing the following structure:

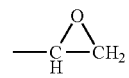

As known to those of ordinary skill in the art, this ring is also commonly referred to as an "epoxy" functionality. The second functional group includes any functional group capable of reacting with the NCO groups on the prepolymer. In one embodiment, the second functional group includes hydroxy groups, amine groups, and combinations thereof.

Examples of suitable oxirane functional resins according to the present invention include, but are not limited to, glycidols, such as glycidyl ethers and glycidyl esters, cycloaliphatic epoxy resins, and mixtures thereof.

In one embodiment, the oxirane functionality is obtained through the use of reaction products of phenols or carboxylic acids and epichlorohydrin, reaction products of an aliphatic polyol and epichlorohydrin, oxidized polyolefins, or combinations thereof. Examples of aliphatic polyols include any of the saturated polyols discussed above with respect the first polymeric system. In one embodiment, the aliphatic polyol is glycerol. The oxidized polyolefins may be oxidized using any suitable acid, e.g., peracetic acid. In another embodiment, the epoxy resin is a modified epoxy resin including halogenated bisphenol. A commercially available bisphenol A epoxy resin is EPON®, a Jeffamine resin manufactured by Huntsman Corporation of Austin, Tex., the general structure of which is shown below:

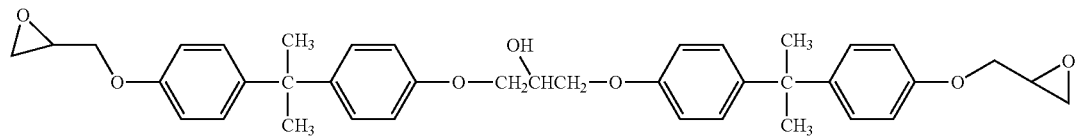

As briefly mentioned above, epoxidized esters of unsaturated alcohols and unsaturated carboxylic acids are contemplated for use as the oxirane functional resin. In one embodiment, the oxirane functional resin includes at least one of glycidyl glycidate; 2,3-epoxybutyl-3,4-epoxypentanoate; 3,4-epoxy-3,4-epoxyhexyl; 3,4-epoxypentanoate; or mixtures thereof. In another embodiment, the oxirane functional resin includes epoxidized esters of unsaturated monohydric alcohols and polycarboxylic acids, such as diglycidyl adipate; diglycidyl isophthalate; di(2,3-epoxybutyl)adipate; di(2,3-epoxybutyl)oxalate; di(2,3-epoxyhexyl)succinate; di(3,4-epoxybutyl)maleate; di(2,3-epoxyoctyl)pimelate; di(2,3-epoxybutyl)phthalate; di(2,3-epoxyoctyl)tetrahydrophthalate; di(4,5-epoxydodecyl) maleate; di(2,3-epoxybutyl) teraphthalate; di(2,3-epoxypentyl)thiodipropionate; di(5,6-epoxytetradecyl) diphenyldicarboxylate; di(3,4-epoxyheptyl)sulfonyldibutyrate; di(5,6-epoxypentadecyl) maleate; di(2,3-epoxybutyl)azelate; di(3,4-epoxybutyl)citrate; di(5,6-epoxyoctyl) cyclohexane-1,3-dicarboxylate; di(4,5-epoxyoctadecyl)malonate; tri(2,3-epoxybutyl)-1,2,4-butanetricarboxylate; and mixtures thereof.

Other examples of epoxy resins suitable for use with the present invention include, but are not limited to, epoxidized derivatives of polyethylenically unsaturated polycarboxylic acids; epoxidized polyesters that are the reaction product of an unsaturated polyhydric alcohol and/or an unsaturated polycarboxylic acid or anhydride groups; epoxidized polyethylenically unsaturated hydrocarbons; glycidyl ethers of novolac resins; and mixtures thereof.

Those of ordinary skill in the art are aware of the methods of forming suitable oxirane-functional compounds for use with the present invention. For example, the diglycidyl ether of bisphenol A, i.e., 2,2-bis[4-(2',3'-epoxypropoxy)phenyl] propane, is formed by reacting bisphenol A and epichlorohydrin. Glycidyl ester resins, such as glycidyl methacrylate ester copolymers, are typically prepared by reacting an epichlorohydrin with a carboxylic acid. Cycloaliphatic epoxy resins are prepared by epoxidation of a suitable unsaturated compound with a peracid.

In one aspect of the invention, the oxirane functional resin is separate from the curing agent. In another aspect of the invention, the curing agent includes an oxirane functional group. Both aspects are discussed in greater detail below with regard to forming the system of the invention.

Forming the System

In general, the compositions of the invention may be formed by preparing a polyurethane-based or polyurea-based prepolymer, reacting the prepolymer with an oxirane functional resin to form an oxirane functional endcapped intermediate, and further reacting the intermediate with a suitable hydrogen donor to form a cured system. In another embodiment, however, the suitable hydrogen donor also includes the oxirane functionality, thus eliminating the need for a separate oxirane functional resin.

As described above, a polyurethane prepolymer is formed by reacting an isocyanate and a polyol and a polyurea prepolymer can be formed by reacting an isocyanate and an amine-terminated compound. The oxirane functionality is then added to the terminal isocyanate groups of the prepolymer by reacting the NCO groups on the prepolymer with the second functional group on an oxirane functional resin. For example, a polyurea prepolymer can be converted into an oxirane functional intermediate through a reaction with glycidol, as shown in the following mechanism:

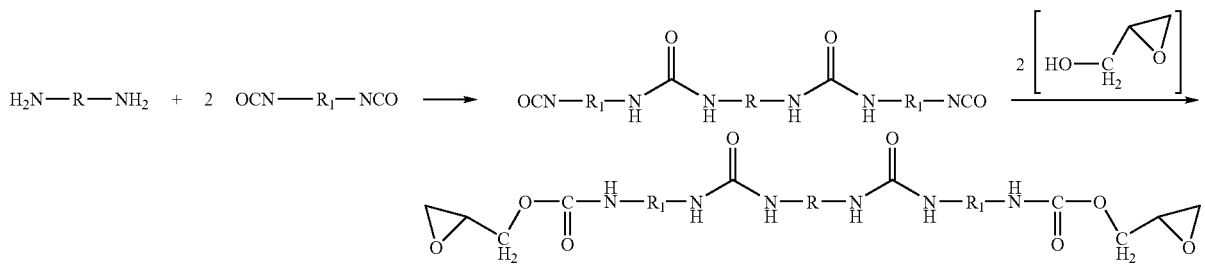

where R and $R_1$ may be independently any straight or branched hydrocarbon moiety, acyclic group, cyclic group, heterocyclic group, aromatic group, phenyl group, hydrocarbylene group, or a mixture thereof.

An oxirane functional polyurethane-based intermediate may be formed in a similar manner, using a hydroxy-terminated component in place of the amine-terminated component. A general reaction scheme is shown below:

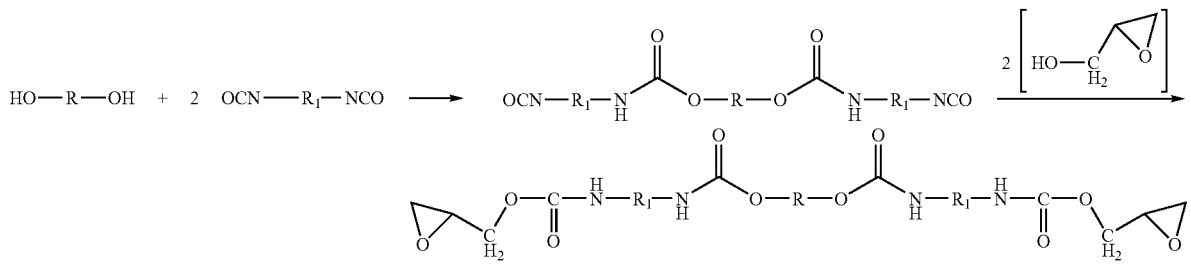

where R and $R_1$ may be independently any straight or branched hydrocarbon moiety, acyclic group, cyclic group, heterocyclic group, aromatic group, phenyl group, hydrocarbylene group, or a mixture thereof.

In addition, polyamide-based polyurea or polyurethane prepolymers may be reacted with a glycidol to form oxirane functional intermediates according to the present invention, An example of a general reaction scheme for a polyamide-based polyurea prepolymer is show below:

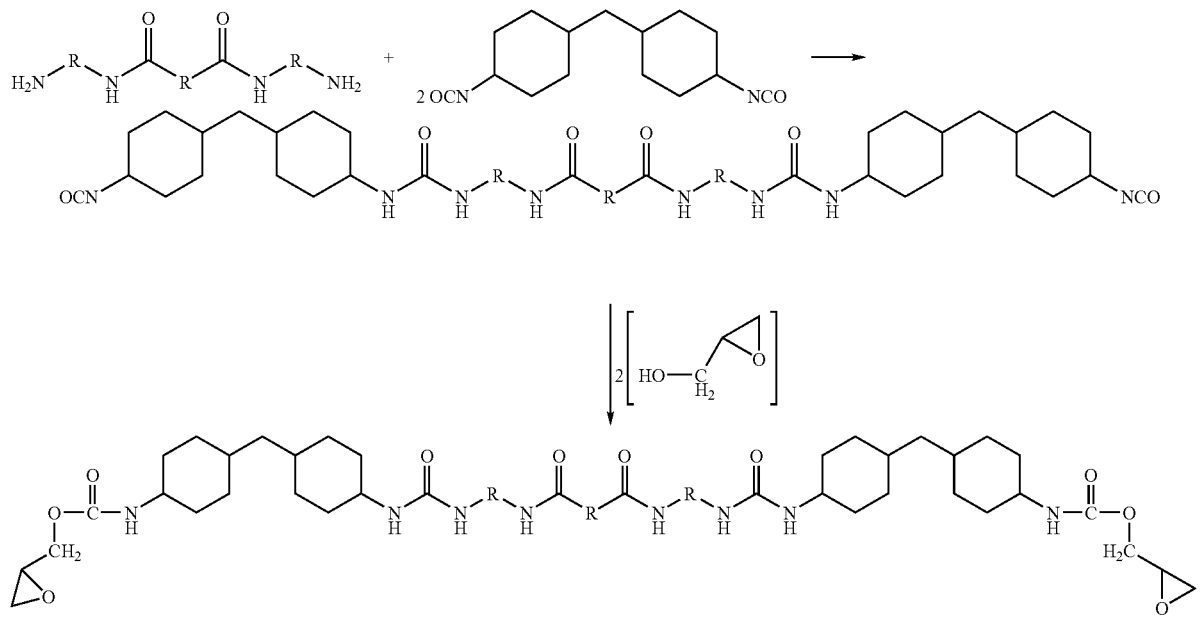

where R may be independently any straight or branched hydrocarbon moiety, acyclic group, cyclic group, heterocyclic group, aromatic group, phenyl group, hydrocarbylene group, or a mixture thereof.

Various catalysts may be used to initiate the reaction of the diisocyanate with the oxirane functional resin. For example, a tin-based catalyst, such as dibutyltin dilaurate, a tertiary amine, or an imidazole may be used to initiate the reaction of a diisocyanate with a glycidol.

The oxirane or epoxy endcaps can be hompolymerized or reacted with active hydrogen-containing compounds such as amines, phenols, Lewis acids, and Lewis bases. In particular, the reactive groups in the oxirane functional endcapped intermediate, i.e., the hydroxy groups and terminal epoxide groups, may be reacted with curing agents that include reactive functional groups such as hydroxy groups, amino groups, thiol groups, epoxy groups, anhydride groups, and combinations thereof. Saturated or unsaturated primary, secondary, and tertiary amines and adducts thereof; polyamides; carbamates; phenols; thiols; anhydrides; low molecular weight acids; and mixtures thereof may be used to form a cured system having a polyurethane-based or polyurea-based backbone. In addition to the reactive groups in the curing agent, the curing agent may also include non-reactive functional groups, such as chlorine, bromine, and substituted sulfur moieties.

Examples of suitable amines include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl) ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; m-phenylene diamine; 4,4'-bis-(sec-butylamino)-diphenylmethane and derivatives thereof; diaminophenyl sulphone; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethylaneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; piperidine; tertiary amines, such as triethylamine, benzyldimethylamine, dimethylaminomethyl phenol, tri(dimethylamino-methyl)phenol, and tri-2-ethylhexoate salt of tri(dimethylaminomethyl)phenol; and mixtures thereof. In addition, amine-glycidyl adducts, amine-ethylene oxide adducts, and cyanoethylation products are contemplated for use in curing the epoxy groups.

In one embodiment, the amine-terminated curing agent is 4,4'-bis-(sec-butylamino)-dicyclohexylmethane. In another embodiment, the amine-terminated curing agent is a polyoxypropylene glycol-based diamine, commercially available from Huntsman under the tradename Jeffamine® D-2000.

The amine-terminated curing agent may have a molecular weight of about 64 or greater. And, in one embodiment, the molecular weight of the amine-curing agent is about 2000 or less. In addition, any of the amine-terminated compounds discussed above with respect to the prepolymer may be used as the curing agent.

Of the list above, the saturated amine-terminated curing agents suitable for use with the present invention include, but are not limited to, ethylene diamine; hexamethylene diamine;

1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

Amines that have been modified to form a polyamine adduct, i.e., those that have been reacted with a small amount of epoxy resin, may also be used as the curing agent. It is believed that the use of polyamine adducts reduces vapor pressure, provides practical mixing ratios, and reduces amine bloom. In addition, polyamidoamines are contemplated for use as the curing agent in the present invention.

When the curing agent is amine-terminated, those of ordinary skill in the art are aware that the amines react with the epoxy group through the active amine hydrogen, e.g., each primary amine is theoretically capable of reacting with two epoxide groups and each secondary amine group is capable of reacting with one epoxide group, as shown below:

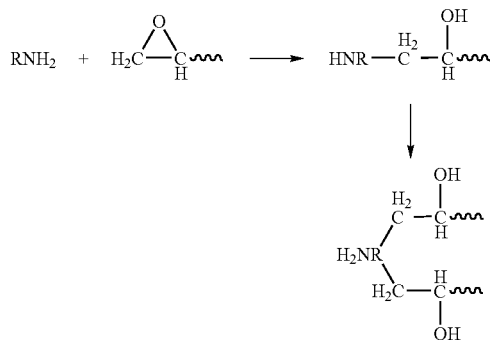

Thus, the hydroxy groups formed should (theoretically) be able to react with the epoxy groups in the oxirane functional polyurethane-based or polyurea-based intermediate to form an ether linkage. In other words, as briefly described above, the hydroxy groups serve to open the epoxide ring, which allows the composition to cure.

One example reaction mechanism, using an oxirane functional polyurea-based intermediate and a polyoxypropylene glycol based amine-terminated curing agent, is shown below:

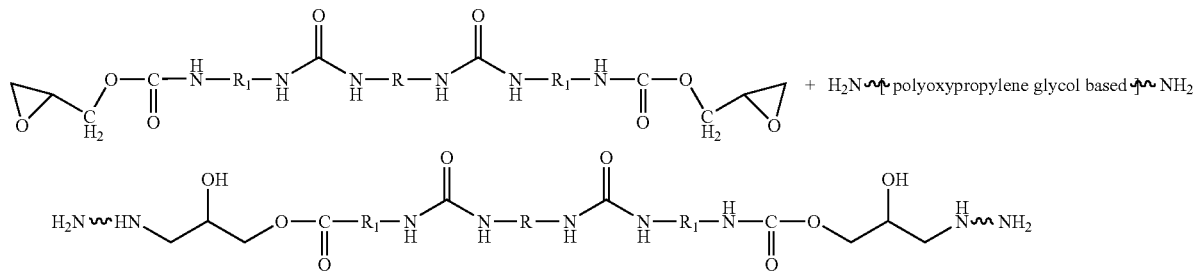

where R and $R_1$ may be independently any straight or branched hydrocarbon moiety, acyclic group, cyclic group, heterocyclic group, aromatic group, phenyl group, hydrocarbylene group, or a mixture thereof. The amine groups at the terminal ends continue to react with the epoxy groups to build up the molecular weight of the polymer.

As mentioned above, polyamides may also be used as an epoxide ring opener. Suitable polyamides include, but are not limited to, any ammonia-based compound that has a hydrogen atom replaced by a carbon/oxygen and organic group, such as those commercially available from Dow Chemical Company under the tradenames VERSAMID®, EUREDUR®, and ANCAMIDE®. Those of ordinary skill in the art should be aware that polyamides are formed by the reaction of aliphatic polyamines and dimer acids. Polyamide adducts are also contemplated for use as curing agents in the present invention. Furthermore, amidoamines may be used as the curing agent in the present invention. Amidoamines are typically formed by reacting an aliphatic polyamine with a monofunctional fatty acid (rather than a dimer acid as in the polyamides discussed above). For example, suitable amidoamines for use with the present invention are those formed following the generic mechanism:

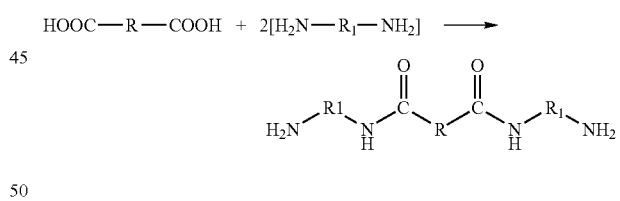

where R and $R_1$ may be independently any straight or branched hydrocarbon moiety, acyclic group, cyclic group, heterocyclic group, aromatic group, phenyl group, hydrocarbylene group, or a mixture thereof. Those of ordinary skill in the art are aware that the chain length and reactivity of the amine can be adjusted depending on the amine and acid used.

Carbamates suitable for use with the present invention include, but are not limited to, those compounds having the generic structure:

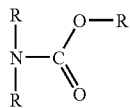

where R can be hydrogen, a straight or branched hydrocarbon moiety, acyclic group, cyclic group, heterocyclic group, aromatic group, phenyl group, hydrocarbylene group, or a mixture thereof.

Nonlimiting examples of suitable thiols for use as the curing agent include any material containing an —SH group such as hydrogen sulfide, thiopropane, and thiopentane. As known to those of ordinary skill in the art, any of the polyols listed above for use in the prepolymer can be used to form a thiol suitable for use in opening the epoxy ring to form a cured system according to the invention. For example, butane diol has the generic structure of HO〰OH and one of the oxygens can be replaced with —S to form a suitable thiol. In addition, any of the following hydroxy-terminated components can be used to form a thiol for use with the invention: ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy) ethoxy]ethoxy}cyclohexane; polytetramethylene ether glycol, preferably having a molecular weight ranging from about 250 to about 3900; resorcinol-di-(beat-hydroxyethyl) ether and its derivatives; hydroquinone-di-(beta-hydroxyethyl)ether and its derivatives; 1,3-bis-(2-hydroxyethoxy)benzene; 1,3-bis-[2-(2-hydroxyethoxy)ethoxy]benzene; N,N-bis(ÿ-hydroxypropyl)aniline; 2-propanol-1,1'-phenylaminobis; and mixtures thereof. In one embodiment, the hydroxy-terminated component has a molecular weight of at least about 50. In another embodiment, the molecular weight of the hydroxy-terminated component is about 2000 or less.

Suitable anhydrides for use in opening the epoxide ring include, but are not limited to, phthalic anhydrides, such as hexahydrophthalic anhydride, methyl hexahydrophthalic anhydride, tetrahydrophthalic anhydride, and methyl tetrahydrophthalic anhydride; dodecenyl succinic anhydride; methyl nadic anhydride; chlorendic anhydride; pyromellitic dianhydride; trimellitic anhydride; and mixtures thereof. In addition, when pyromellitic dianhydride is used, maleic anhydride may also be used.

Nonlimiting examples of low molecular weight acids include acid functional polyesters, adipic acid, carboxylic acid, pentaerythrytol/MHHPA, and mixtures thereof.

The amount of curing agent to epoxy resin is any suitable amount that results in a completely cured epoxy system. For example, the curing agent to epoxy resin ratio, i.e., the ratio of hydroxy groups in the curing agent to epoxide groups in the oxirane functional intermediate, may range from about 0.4:1.4 (on an equivalent basis). In one embodiment, the curing agent to epoxy resin ratio is about 0.6:1.2. Anhydrides, for example, may be used at a ratio of about 0.85:1.1 moles anhydride carboxyl group per epoxy equivalent. Thus, in another embodiment, the ratio of hydroxy groups to epoxide groups is about 0.80:1.1 to about 0.9:1.0. In yet another embodiment, the ratio of curing agent to epoxy resin is about 0.6:1.0.

To further improve the shear resistance of the resulting polyurea elastomers, a trifunctional curing agent can be used to help improve cross-linking. Preferably, a triol such as trimethylolpropane or a tetraol such as N,N,N',N'-tetrakis(2-hydroxylpropyl)ethylenediamine may be added to the formulations.

The reaction between the oxirane functional groups and the curing agent can proceed with or without a catalyst. For example, while the reaction of an epoxy group with a carboxyl group is successful without a catalyst for numerous applications, catalysis is often used to achieve sufficient reaction rates in manufacturing. When using a catalyst to modify the reaction rate between the oxirane functional groups and the curing agent, phosphines and phosphonium salts may be useful.

In addition, catalytic curing agents, i.e., those compounds that promote epoxy to epoxy or epoxy to hydroxy reactions but do not themselves serve as direct cross-linking agents, are contemplated for use with the present invention. In particular, benzyldimethylamine, $BF_3$ monoethylamine, dicyandiamide, dimethylaminomethyl phenol, tris(dimethyl aminomethyl)phenol, and alpha methylbenzyl dimethylamine may be used to promote epoxy to epoxy or epoxy to hydroxy reactions.

Composition Additives

Additional materials conventionally included in polyurethane and polyurea compositions may be added to the polyurethane and polyurea prepolymers, the oxirane functional intermediates, or the composite compositions of the invention. As discussed above, for example, catalysts may be used to modify the cure rate. In addition, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives may be included in the compositions of the invention. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Density-Adjusting Filler(s)

Fillers may be added to the polyurethane and polyurea compositions of the invention to affect Theological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers

The compositions of the invention may include both saturated and unsaturated components. And, while the use of only saturated components aids in avoiding the yellowing over time that occurs with unsaturated components, the use of various UV absorbers and light stabilizers to any of the above compositions may help to also maintain the tensile strength, elongation, and color stability. The use of light stabilizing components also may assist in preventing cover surface fractures due to photodegradation.

As such, the compositions of the invention may contain at least one light stabilizing component to prevent significant yellowing from unsaturated components contained therein. The use of a light stabilizer is preferred, for instance, for compositions having a difference in yellowness ($\Delta Y$) of about 15 or greater, but also may be added to compositions having a difference in yellowness of from about 12 to about 15. As used herein, light stabilizer may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

To further improve the shear resistance and heat resistance of the resulting polyurea elastomers, a multi-functional curing agent can be used to help improve cross-linking. In one embodiment of the present invention, the multi-functional curing agent is modified with a compatible freezing point depressing agent as detailed above. For example, a triol such as trimethylolpropane or a tetraol such as N,N,N',N'-tetrakis (2-hydroxylpropyl) ethylenediamine may be added to the composition. In one embodiment, a primary diamine, such as 3,3'-dimethyl-4,4'-diaminodicyclohexylmethane or 4,4'-diaminodicyclohexylmethane is added to the polyurea composition. Useful triamine curing agents for improving the crosslinking of polyurea elastomers include, but are not limited to: propylene oxide-based triamines; trimethylolpropane-based triamines; glycerin-based triamines; N,N-bis{2-[(aminocarbonyl)amino]ethyl}-urea; N,N',N'''-tris(2-aminoethyl)-methanetriamine; N1-(5-aminopentyl)-1,2,6-hexanetriamine; 1,1,2-ethanetriamine; N,N',N'''-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl) amino]butyl] amino]propyl}-1,2,6-hexanetriamine; di-9-octadecenyl-(Z, Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl) amino]butyl]amino]propyl}-1,2,6-hexanetriamine; N1-{4-[(3-aminopropyl)amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6,11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl)1,2-propanediamine; 1,2,3-propanetriamine; 2-methyl-1,2,3-propanetriamine; and mixtures thereof.

Composition Blends

The compositions of the invention preferably include from about 1 percent to about 100 percent polyurea-based polymers or polyurethane-based polymers, however, the compositions may also be blended with other materials. In one embodiment, the composition contains about 10 percent to about 90 percent polyurea-based polymer or polyurethane-based polymer, preferably from about 10 percent to about 75 percent polyurea-based polymer or polyurethane-based polymer, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

The polyurea-based compositions and polyurethane-based compositions of the invention may also be in the form of a blend with at least one highly neutralized polymer. For example, a prepolymer can be chain extended with a curing agent and then blended with a highly neutralized polymer. Suitable highly neutralized polymers include, but are not limited to, polymers containing α,β-unsaturated carboxylic acid groups, or the salts thereof, that have been highly neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending). The acid moieties of the highly-neutralized polymers ("HNP"), typically ethylene-based ionomers, are preferably neutralized greater than about 70 percent, more preferably greater than about 90 percent, and most preferably at least about 100 percent.

Golf Ball Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, intermediate layer, and/or cover of a golf ball, each of which may have a single layer or multiple layers. As used herein, the term "multilayer" means at least two layers.

Non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Golf Ball Core Layer(s)

The cores of the golf balls formed according to the invention may be solid, semi-solid, hollow, fluid-filled or powder-filled, one-piece or multi-component cores. As mentioned above, the core may be formed including the compositions of the invention. In the alternative, the core may be formed from any conventional core material known to one of ordinary skill in that art. For example, thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers may be used to form the core.

In one embodiment, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending U.S. Patent Publication No. 2003/0119989, the entire disclosure of which is incorporated by reference herein, may be used to form the reaction product.

As used herein, the terms core and center are generally used interchangeably to reference the innermost component of the ball. In some embodiments, however, the term "center" is used when there are multiple core layers, i.e., a center and an outer core layer.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from any of the compositions of the invention.

The intermediate layer(s) may also likewise include one or more homopolymeric or copolymeric thermoset and thermoplastic materials, such as vinyl resins, polyolefins, polyurethanes, polyureas, polyamides, acrylic resins and blends of these resins with polyvinyl chloride, elastomers, and the like, olefinic thermoplastic rubbers, block copolymers of styrene and butadiene, isoprene or ethylene-butylene rubber, copoly (ether-amide), polyphenylene oxide resins or blends of polyphenylene oxide with high impact polystyrene, polyesters, and mixtures thereof.

In one embodiment, the intermediate layer includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/non-ionomer blends are disclosed in co-pending U.S. Patent Publication No. 2003/0078348, the entire disclosure of which is incorporated by reference herein. Another example of a polyamide-nonionomer blend is a polyamide and non-ionic polymers produced using non-metallocene single-site catalysts. Examples of suitable single-site catalyzed polymers are disclosed in co-pending U.S. Pat. No. 6,476,130, of which the entire disclosure is incorporated by reference herein.

Golf Ball Cover(s)

The cover layer may be formed, at least in part, from at least one of the compositions of the invention. For example, a cover layer may include a polyurea-based composition formed from an oxirane functional intermediate and a curing agent. In an alternate embodiment, the cover layer may be formed from a polyurethane-based composition of the invention.

When the compositions of the invention are incorporated into a core or intermediate/inner cover layer, the cover layer may also be formed from a composition of the invention or, the cover layer may be formed from one or more of the homopolymeric or copolymeric materials discussed in the section above pertaining to the intermediate layer. The cover may also be at least partially formed from the polybutadiene reaction product discussed above with respect to the core.

Methods of Forming Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

When the compositions of the invention are incorporated into a cover layer, for example, the polyurea-based and polyurethane-based materials of the invention may be applied over the inner ball using a variety of application techniques such as spraying, compression molding, dipping, spin coating, casting, or flow coating methods that are well known in the art. In one embodiment, the compositions of the invention are formed over an inner ball using a combination of casting and compression molding.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

U.S. Pat. No. 5,733,428, the entire disclosure of which is hereby incorporated by reference, discloses a method for forming a polyurethane-based cover on a golf ball core. Because this method relates to the use of both casting thermosetting and thermoplastic material as the golf ball cover, wherein the cover is formed around the core by mixing and introducing the material in mold halves, the polyurea-based compositions may also be used employing the same casting process.

Similarly, U.S. Pat. No. 5,006,297 and U.S. Pat. No. 5,334,673 both also disclose suitable molding techniques that may be utilized to apply the polyurea-based and polyurethane-based compositions of the invention. However, the method of the invention is not limited to the use of these techniques; other methods known to those skilled in the art may also be employed. For instance, other methods for holding the ball core may be utilized instead of using a partial vacuum.

Golf Ball Post-Processing

The golf balls of the present invention may be painted, coated, or surface treated for further benefits. In addition, trademarks or other indicia may be stamped, i.e., pad-printed, on the outer surface of the ball cover, and the stamped outer surface may then be treated with at least one clear coat to give the ball a glossy finish and protect the indicia stamped on the cover. Furthermore, the golf balls of the invention may be subjected to dye sublimation, wherein at least one golf ball component is subjected to at least one sublimating ink that migrates at a depth into the outer surface and forms an indicia, as disclosed in U.S. Patent Publication No. 2003/0106442, the entire disclosure of which is incorporated by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core, which may include more than one layer, may have a diameter ranging from about 0.09 inches to about 1.65 inches. In one embodiment, the diameter of the core of the present invention is about 1.2 inches to about 1.630 inches. In another embodiment, the core has a diameter of about 1.55 inches to about 1.65 inches. For example, in one embodiment, the core has a diameter of 1.5 inches to 1.62 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.05 inches or less, preferably from about 0.02 inches to about 0.05 inches, more preferably abut 0.02 inches and about 0.035 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater, and more preferably 0.02 inches to 0.1 inches. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55

Shore D to about 65 Shore D. The intermediate layer may also be about 65 Shore D or greater.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. For example, the flexural modulus of the cover layer may be from about 10,000 psi to about 70,000 psi, from about 12,000 psi to about 60,000 psi, or from about 14,000 psi to about 50,000 psi.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 $g/(m^2 \times day)$ or less, such as about 0.45 to about 0.95 $g/(m^2 \times day)$, about 0.01 to about 0.9 $g/(m^2 \times day)$ or less, at 38° C. and 90 percent relative humidity.

Light Stability

The light stability of the cover may be quantified by the difference in yellowness index ($\Delta YI$), i.e., yellowness measured after a predetermined exposure time—yellowness before exposure. In one embodiment, the $\Delta YI$ is about 10 or less after 5 days (120 hours) of exposure, preferably about 6 or less after 5 days of exposure, and more preferably about 4 or less after 5 days of exposure. In one embodiment, the $\Delta YI$ is about 2 or less after 5 days of exposure, and more preferably about 1 or less after 5 days of exposure. The difference in the b chroma dimension (Δb*, yellow to blue) is also a way to quantify the light stability of the cover. In one embodiment, the Δb* is about 4 or less after 5 days (120 hours) of exposure, preferably about 3 or less after 5 days of exposure, and more preferably about 2 or less after 5 days of exposure. In one embodiment, the Δb* is about 1 or less after 5 days of exposure.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Golf Balls Formed from Polyurethane-Based Compositions

Golf balls may be made according to the invention using a solid core, an intermediate layer, and a cover formed of a polyurethane-based composition of the invention, which is the reaction product of an oxirane functional intermediate cured with a curing agent. In particular, the covers may be formed from the reaction product of a polyurethane prepolymer, a glycidol, and a curing agent.

The polyurethane prepolymer may be formed from an isocyanate, e.g., $H_{12}MDI$, and a hydroxy-terminated compound. The excess isocyanate may then be subsequently endcapped with a glycidol group to form an epoxy-capped polyurethane intermediate. After the intermediate is formed, it may be reacted with a suitable hydrogen donor to form a cured system.

Example 2

Golf Balls Formed from Polyurea-Based Compositions

Golf balls may be made according to the invention using a solid core, an intermediate layer, and a cover formed of a polyurea-based composition of the invention, which is the reaction product of an oxirane functional intermediate cured with a curing agent. In particular, the covers may be formed from the reaction product of a polyurethane prepolymer, a glycidol, and a curing agent.

The polyurea prepolymer may be formed from an isocyanate, e.g., $H_{12}MDI$, and an amine-terminated compound. The excess isocyanate may then be subsequently endcapped with a glycidol group to form an epoxy-capped polyurea-based intermediate. After the intermediate is formed, it may be reacted with a suitable hydrogen donor to form a cured system. For example, an amine-terminated curing agent, such as 4,4'-bis-(sec-butylamino)-dicyclohexylmethane (UNILINK® 4200, available as from Huntsman Corporation), N,N'-diisopropyl-isophorone diamine (JEFFLINK® 754, available from Huntsman Corporation), or mixtures thereof, may be used to cure the intermediate.

Other than in the examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein at least a portion of the golf ball is formed from a composition comprising:

an intermediate formed from a polyurea prepolymer and an oxirane functional resin, wherein the oxirane functional resin comprises reaction products of phenols or carboxylic acids and epichlorohydrin, reaction products of an aliphatic polyols and epichlorohydrin, oxidized polvolefins, or combinations thereof and wherein the intermediate comprises at least one terminal group comprising an oxirane functionality having the structure:

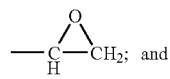 and a curing agent.

2. The golf ball of claim 1, wherein the curing agent comprises reactive functional groups selected from the group consisting of hydroxy groups, amino groups, thiol groups, epoxy groups, anhydride groups, and combinations thereof.

3. The golf ball of claim 2, wherein the curing agent further comprises non-reactive functional groups selected from the group consisting of chlorine, bromine, and substituted sulfur moieties.

4. The golf ball of claim 1, wherein the oxirane functional resin comprises glycidol, a cycloaliphatic epoxy resin, or a mixture thereof 5. The golf ball of claim 1, wherein the oxirane functional resin comprises glycidyl glycidate; 2,3-epoxybutyl-3,4-epoxypentanoate; 3,4-epoxy-3,4-epoxyhexyl; 3,4-epoxypentanoate; diglycidyl adipate; diglycidyl isophthalate; di(2,3-epoxybutyl) adipate; di(2,3-epoxybutyl) oxalate; di(2,3-epoxyhexyl) succinate; di(3,4-epoxybutyl) maleate; di(2,3-epoxyoctyl) pimelate; di(2,3-epoxybutyl) phthalate; di(2,3-epoxyoctyl) tetrahydrophthalate; di(4,5-epoxydodecyl) maleate; di(2,3-epoxybutyl) teraphthalate; di(2,3-epoxypentyl) thiodipropionate; di(5,6-epoxytetradecyl) diphenyldicarboxylate; di(3,4-epoxyheptyl) sulfonyldibutyrate; di(5,6-epoxypentadecyl) maleate; di(2,3-epoxybutyl) azelate; di(3,4-epoxybutyl) citrate; di(5,6-epoxyoctyl) cyclohexane- 1,3-dicarboxylate; di(4,5-epoxyoctadecyl) malonate; tri(2,3-epoxybutyl)-1,2,4-butanetricarboxylate; or mixtures thereof.

6. The golf ball of claim 1, wherein the curing agent comprises saturated or unsaturated primary, secondary, and tertiary amines and adducts thereof, polyamides, carbamates, phenols, thiols, anhydrides, low molecular weight acids, and mixtures thereof 7. The golf ball of claim 1, wherein the intermediate has the following structure:

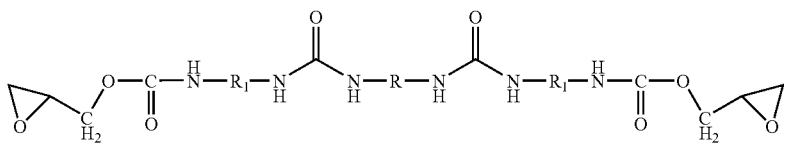

wherein R and $R_1$ independently comprise straight or branched hydrocarbon moieties, acyclic groups, cyclic groups, heterocyclic groups, aromatic groups, phenyl groups, hydrocarbylene group, or a mixture thereof.

8. The golf ball of claim 1, wherein the portion is the cover of the golf ball.

9. The golf ball of claim 6, wherein the curing agent is selected from the group consisting of ethylene diamine; hexamethylene diamine; 1-methyl-2,6-cyclohexyl diamine; 2,2,4- and 2,4,4-trimethyl- 1,6-hexanediamine; 4,4'-bis-(sec-butylamino)-dicyclohexylmethane and derivatives thereof 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof diethylene glycol bis-(aminopropyl) ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5diethylthio-2,4-toluenediamine; 3,5-diethylthio-2,6-toluenediamine; m-phenylene diamine; 4,4'-bis-(sec-butylamino)-diphenylmethane and derivatives thereof; diaminophenyl sulphone; 1,4-bis-(sec-utylamino)-benzene; 1,2-bis-(sec-butylamino)-benzene; N,N '-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; piperidine; tertiary amines, such as triethylamine, benzyldimethylamine, dimethylaminomethyl phenol, tri(dimethylamino-methyl) phenol, and tri-2-ethylhexoate salt of tri(dimethylaminomethyl) phenol; and mixtures thereof.

10. A golf ball comprising a core and a cover, wherein at least a portion of the cover is formed from a composition comprising:

an intermediate having the following structure:

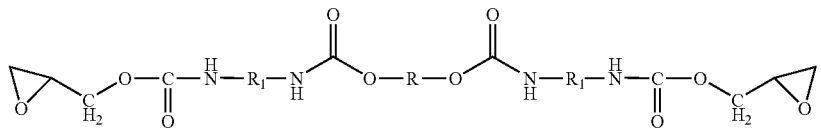

wherein R and $R_1$ independently comprise straight or branched hydrocarbon moieties, acyclic groups, cyclic groups, heterocyclic groups, aromatic groups, phenyl groups, hydrocarbylene group, or a mixture thereof; and a curing agent selected from the group consisting of saturated or unsaturated primary, secondary, and tertiary amines and adducts thereof; polyamides; carbamates; phenols; thiols; anhydrides; low molecular weight acids; and mixtures thereof.

11. The golf ball of claim 10, wherein the cover comprises an inner cover layer and an outer cover layer, and wherein the outer cover layer comprises the composition.

12. The golf ball of claim 11, wherein the inner cover layer comprises thermoplastic or thermoset material.

13. The golf ball of claim 11, wherein the inner cover layer comprises a highly neutralized polymer.

14. The golf ball of claim 10, wherein the curing agent is selected from the group consisting of ethylene diamine; hexamethylene diamine; 1-methyl-2,6-cyclohexyl diamine; 2,2, 4- and 2,4,4-trimethyl- 1,6-hexanediamine; 4,440 -bis-(sec-butylamino)-dicyclohexylmethane and derivatives thereof; 1,4-bis-(sec-butylamino)-cyclohexane; 1,2-bis-(sec-butylamino) -cyclohexane; 4,4'-dicyclohexylmethane diamine; 1 ,4-cyclohexane-bis-(methylaminc); 1,3 -cyclohexane-bis- (methylamine), isomers, and mixtures thereof diethylene glycol bis -(aminopropyl) ether; 2-methylpentamethylene-diamine; diaminocyclohexane, isomers, and mixtures thereof diethylene triamine; triethylene tetramine; tetraethylene pentamine; propylene diamine; 1 ,3-diaminopropane; dimethylamino propylamine; diethylamino propylamine; imido -bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; m-phenylene diamine; 4,440 -bis-(sec-butylamino)-diphenylmethane and derivatives thereof diaminophenyl sulphone; 1 ,4-bis -(sec-butylamino)-benzene; 1,2-bis-(sec-butylamino)-benzene; N,N'-dialkylamino -diphenylmethane; trimethyleneglycol-di-p-aminobenzoate; polytetramethyleneoxide-di-p -aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl -isophoronediamine; polyoxypropylene diamine; propylene oxide-based triamine; 3,3'-dimethyl -4,4'-diaminocyclohexylmethane; piperidine; tertiary amines, such as triethylamine, benzyldimethylamine, dimethylaminomethyl phenol, tri(dimethylamino-methyl) phenol, and tri -2-ethyihexoate salt of tri (dimethylaminomethyl) phenol; and mixtures thereof.

15. The golf ball of claim 12, wherein the inner cover layer comprises an ionomeric resin.

16. A golf ball comprising:
a core; and
a cover, wherein the cover is formed from a composition comprising an intermediate having at least one of the following structures:

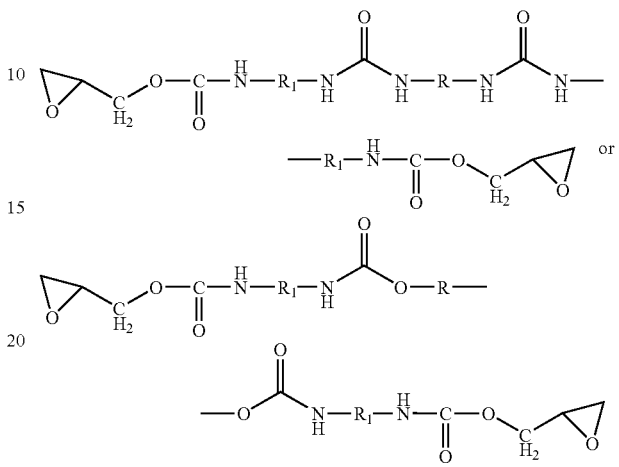

wherein R and $R_1$ independently comprise straight or branched hydrocarbon moieties, acyclic groups, cyclic groups, heterocyclic groups, aromatic groups, phenyl groups, hydrocarbylene group, or a mixture thereof; and
a curing agent.

17. The golf ball of claim 16, further comprising an intermediate layer formed from a thermoplastic or thermoset material.

18. The golf ball of claim 16, wherein the curing agent comprises reactive functional groups selected from the group consisting of hydroxy groups, amino groups, thiol groups, epoxy groups, anhydride groups, and combinations thereof.

19. The golf ball of claim 18, wherein the curing agent further comprises non-reactive functional groups selected from the group consisting of chlorine, bromine, and substituted sulfur moieties.

20. The golf ball of claim 16, wherein the curing agent comprises a curative and a catalyst.

21. The golf ball of claim 20, wherein the catalyst comprises phosphine salt, phosphonium salt, or a mixture thereof.

22. The golf ball of claim 17, wherein the inner cover layer comprises an ionomeric resin.

* * * * *